Nov. 25, 1969  J. DE SIMAS  3,480,196
CARGO CONTAINERS
Filed Feb. 2, 1968  5 Sheets-Sheet 1
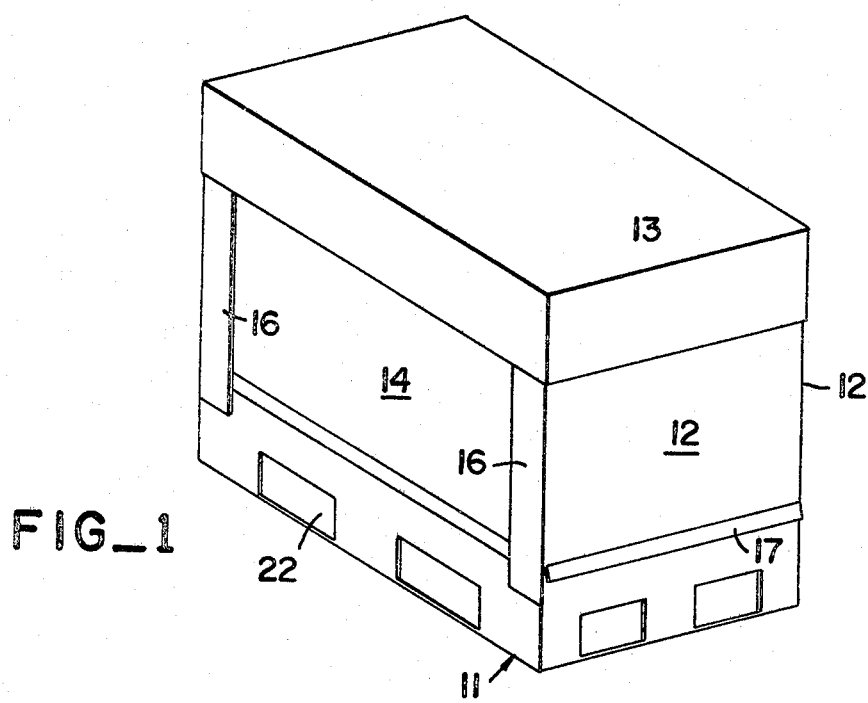
FIG_1
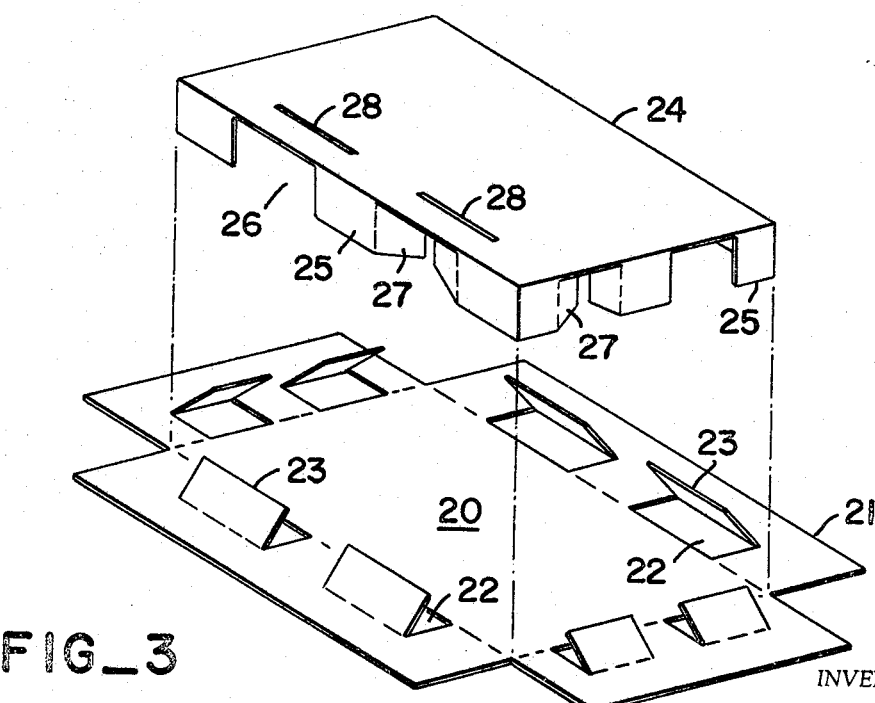
FIG_3
INVENTOR.
JOHN de SIMAS
BY
Townsend and Townsend
ATTORNEYS

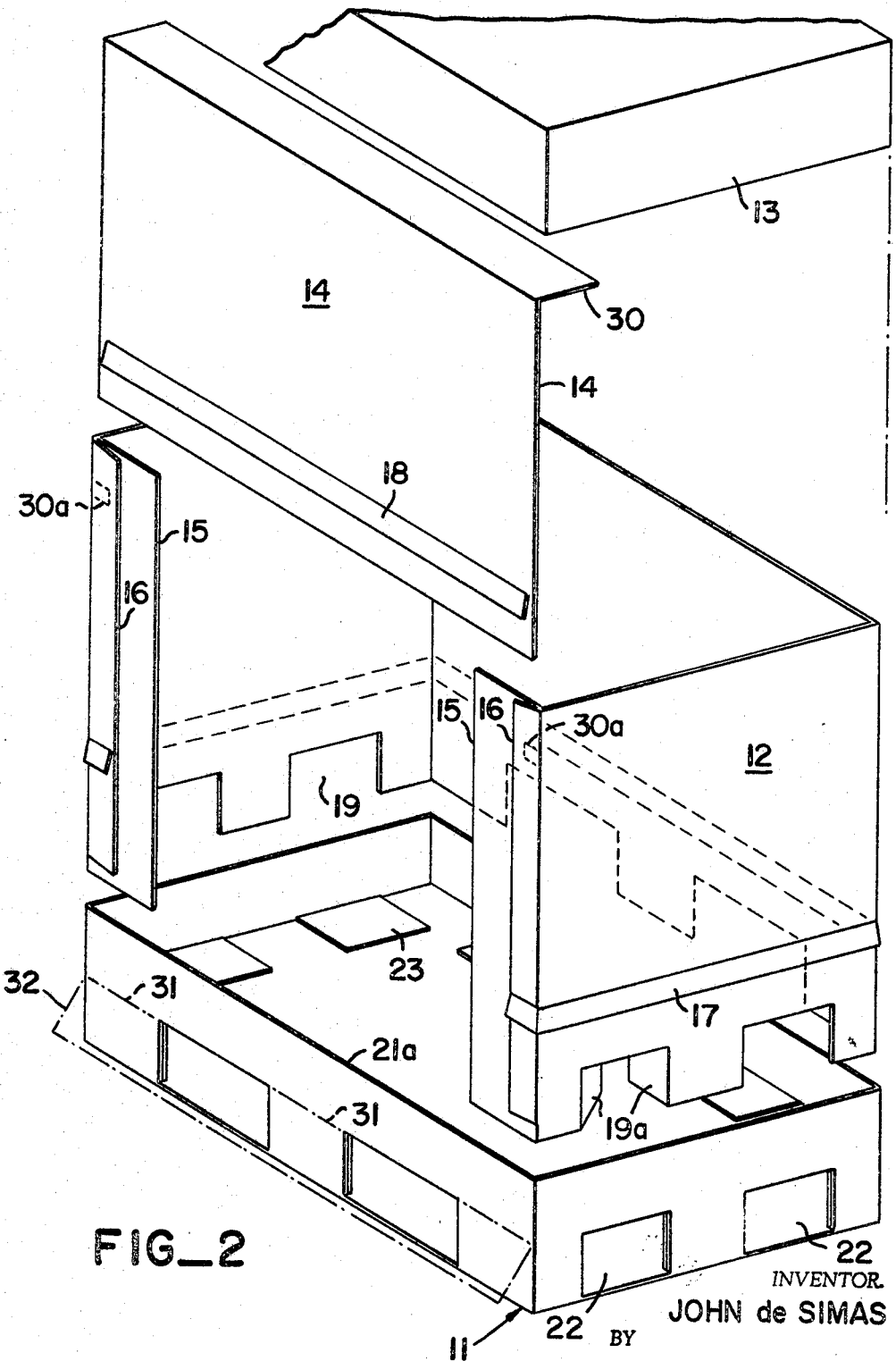

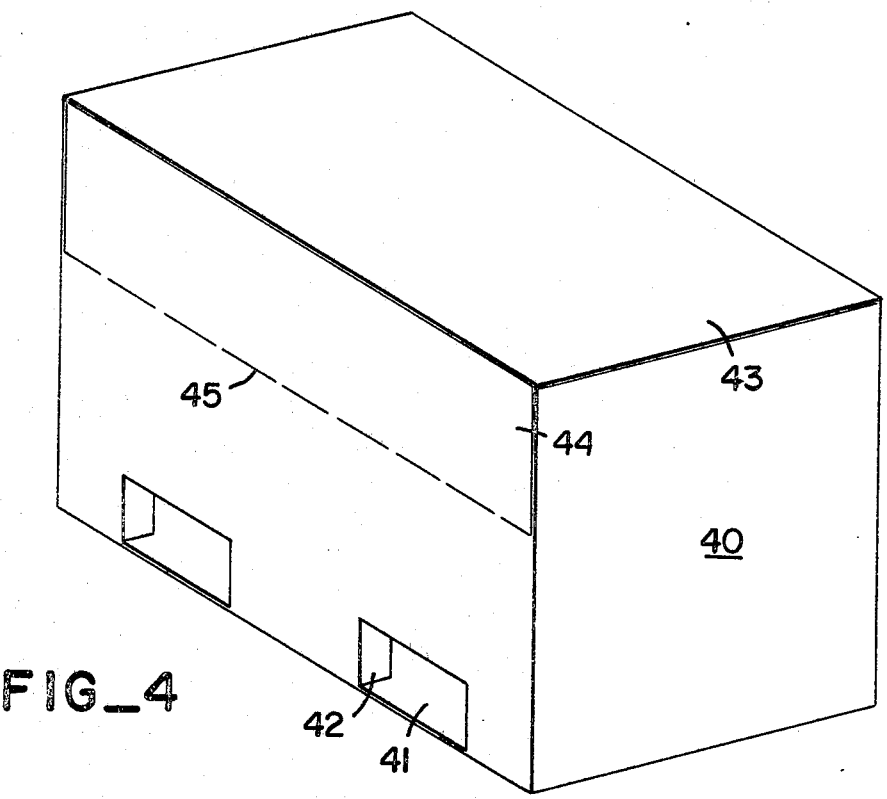
FIG_4
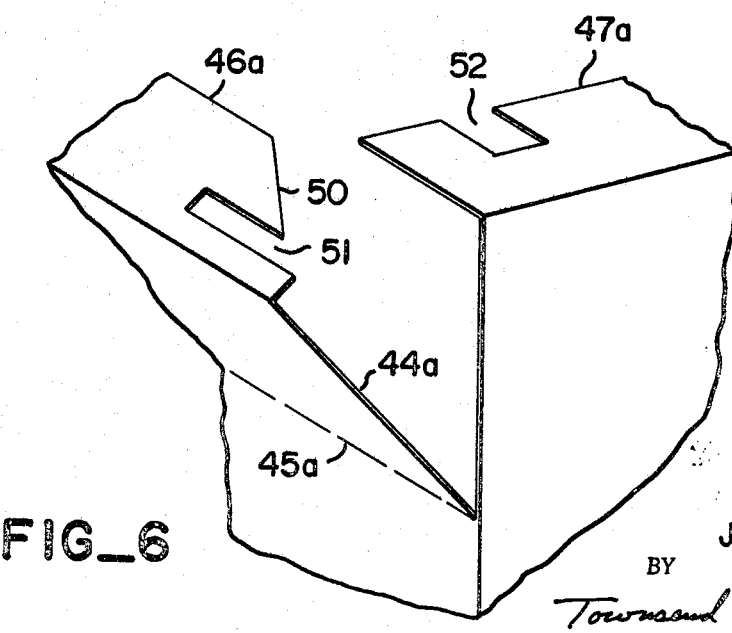
FIG_6
INVENTOR.
JOHN de SIMAS
BY
Townsend and Townsend
ATTORNEYS

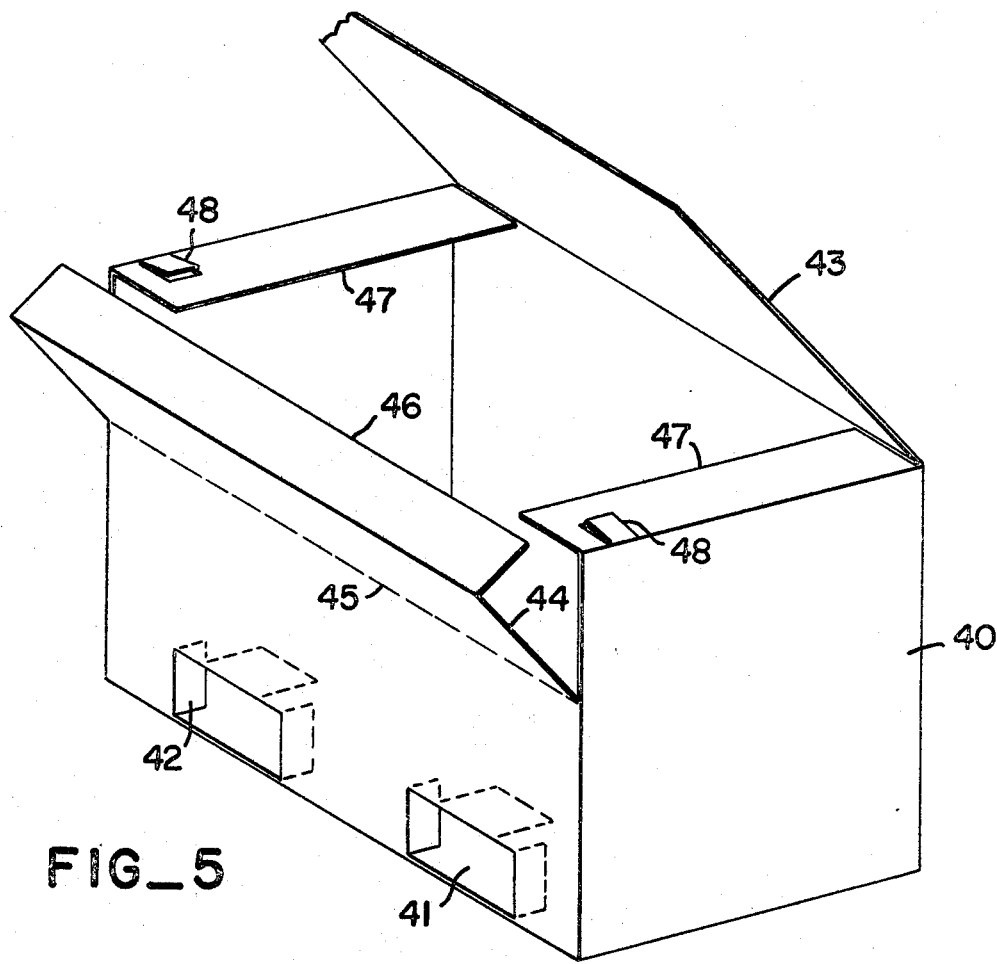
FIG_5
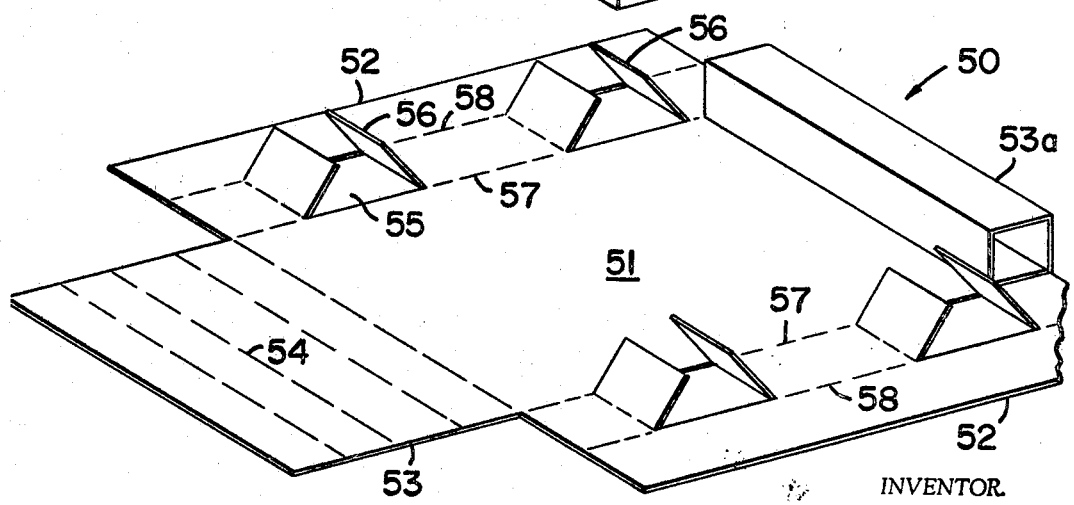
FIG_7
INVENTOR.
JOHN de SIMAS
BY
Townsend and Townsend
ATTORNEYS Nov. 25, 1969
J. DE SIMAS
3,480,196
CARGO CONTAINERS
Filed Feb. 2, 1968
5 Sheets-Sheet 5
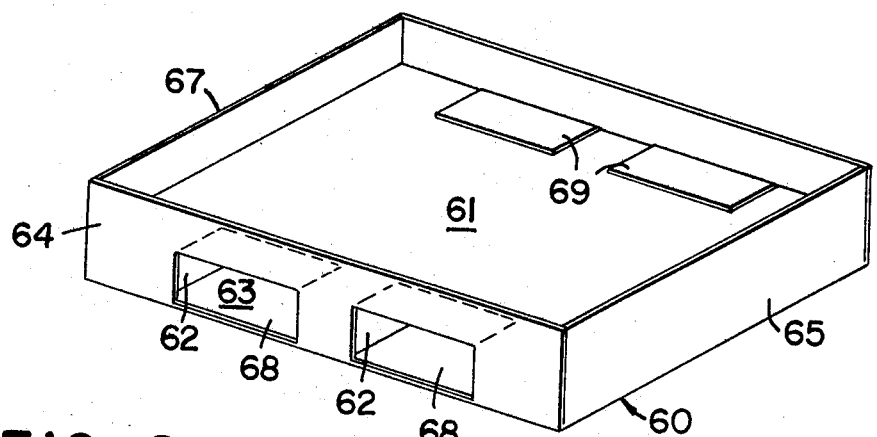
FIG_8
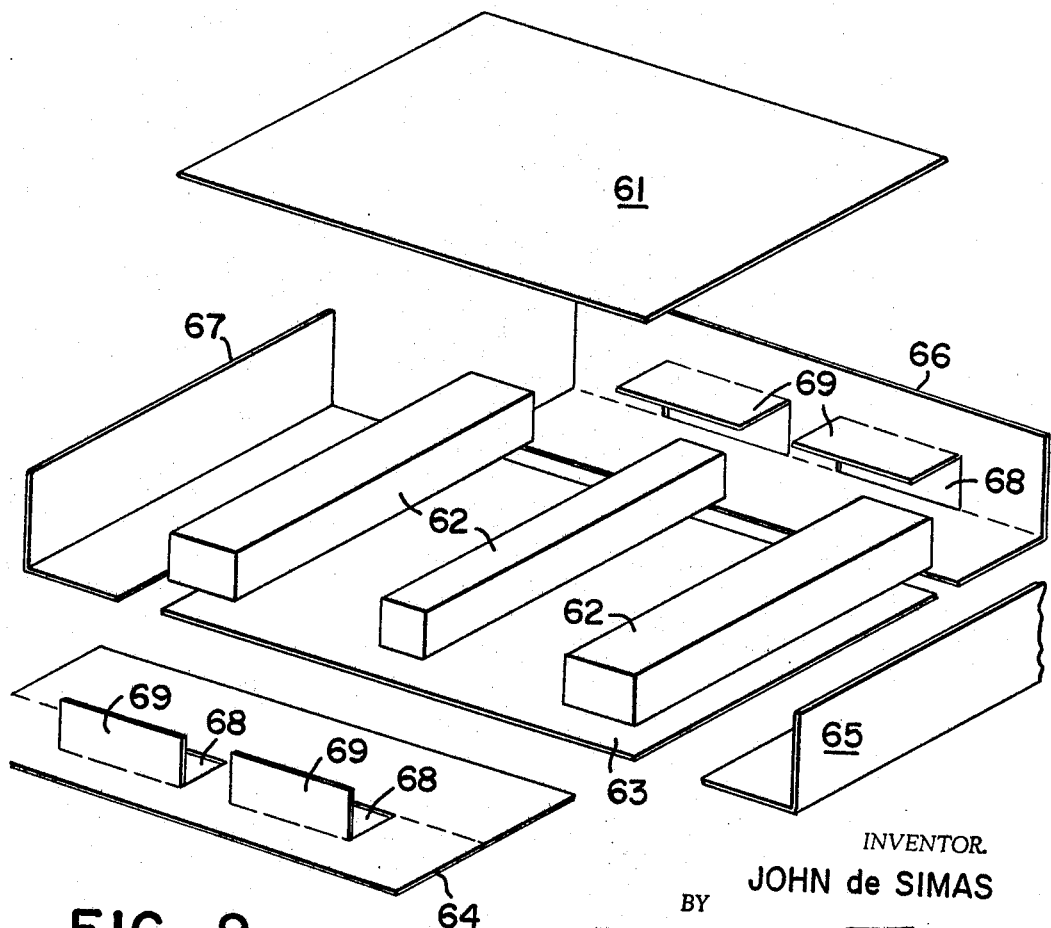
FIG_9
INVENTOR.
JOHN de SIMAS
BY
Townsend and Townsend
ATTORNEYS

3,480,196
CARGO CONTAINERS
John de Simas, 960 Hillcrest, Millbrae, Calif. 94030
Filed Feb. 2, 1968, Ser. No. 702,649
Int. Cl. B65d 5/32, 5/44, 19/06
U.S. Cl. 229—23                                            15 Claims

ABSTRACT OF THE DISCLOSURE

Collapsible and reuseable palletized cargo containers are disclosed comprised of separate interlocking parts for converting pallets into palletized cargo containers including means for access to the inside of the containers having weather protection features. A method of custom making pallets of specified dimension from separate reproducible parts and a method of converting the pallet to a palletized cargo container are also disclosed.

---

This invention relates to new and improved palletized cargo containers.

It is an object of the present invention to provide palletized cargo containers from separate interlocking parts which are collapsible and reuseable, and to provide a method of converting pallets into palletized cargo containers from separate interlocking parts.

Another object of the invention is to provide easy access to the inside of cargo containers including hinged doors, and removable and replaceable sliding panel doors having weather protection features.

A further object of the invention is to provide a method for facilitating production of custom pallets according to specified dimensions from separate reproducible stock items and also to provide a method of converting such pallets into palletized cargo containers.

In order to accomplish these results the present invention contemplates the provision of a pallet comprised of a pallet base portion having a bottom and four side walls and cutout portions in at least one side wall near the bottom for receiving the tines of a forklift truck. The flaps from the cutout portions provide means for positioning a platform or baseboard on which the packaged cargo rests. The platform is spaced from the bottom of the pallet base portion by spacing means including either the folded edges of the platform or spacing blocks of a solid material or a flexible material. The invention further contemplates converting the pallet into a cargo container by providing folded container side wall portions adapted to be inserted between the side walls of the pallet base portion and the platform or baseboard. The lower edges of the container side walls inserted in the pallet extend to the bottom of the pallet and are cut to match the cutout portions in the pallet in order not to interfere with the tines of a forklift truck. At least one of the container side walls forms a separately removable and replaceable panel door, placeable within flaps overlapping the sides of the door to provide weather protection and guides for positioning the panel door. Other flaps provided around the container walls form a skirt which overlaps the pallet to provide further weather protection. An enclosing cover provides further structural support for the cargo container.

According to another aspect of the invention, a pallet is provided from a platform or baseboard having edges folded thereunder to space the platform or baseboard from the ground. Cutout portions are provided in the folded edges adapted to receive the tines of a forklift truck. The pallet is converted into a cargo container by placing a container portion having four walls and a hinged top over the pallet, frictionally engaging its outer edges. Cutout portions are provided in the lower edge of the walls of the container portion adapted to overlap the cutout portions in the pallet. The flaps from the cutout portions at the bottom edge of the container walls extend inwardly to engage the pallet and prevent separation of the pallet and container portions.

The invention also contemplates a method of making pallets of desired dimensions from separate sections easily cut to produce the required pallet dimension in combination. The pallet may be used as a separate custom-made pallet for different cargo containers, or converted into a palletized cargo container as described above.

The cargo containers described herein may be made of corrugated cardboard or other lightweight cargo material such as aluminum, and are therefore particularly suitable for lightweight shipping requirements such as in the air cargo industry. The cargo containers and pallets described herein may also be formed of a composite material such as by laminating plywood to corrugated cardboard to provide a reinforced structure. The plywood may be laminated to the cardboard with a water base resin or glue. Other materals may also be laminated to corrugated cardboard to provide reinforced structural strength such as fibreboard, fibre glass, and other synthetic materials.

Other objects, features and advantages of the present invention will become apparent in the following specification and accompanying drawings.

FIG. 1 is a perspective view of an assembled palletized cargo container embodying the present invention;

FIG. 2 is an exploded perspective view of the cargo container illustrated in FIG. 1;

FIG. 3 is an exploded perspective view of the pallet portion of the cargo container illustrated in FIG. 1;

FIG. 4 is a perspective view of another assembled cargo container embodying the present invention;

FIG. 5 is a perspective view of the container portion of the cargo container in FIG. 4 showing the hinged top and one form of closure means;

FIG. 6 is a fragmentary perspective view showing an alternate form of closure means for the cargo container;

FIG. 7 is a perspective view of the pallet portion of the cargo container of FIG. 5 partially disassembled and in an inverted position;

FIG. 8 is a perspective view of another form of pallet embodying the present invention suitable for use in the palletized cargo container illustrated in FIG. 1;

FIG. 9 is an exploded view of the pallet illustrated in FIG. 8.

In the embodiment of the present invention illustrated in FIG. 1 there is generally provided a pallet 11 which has been converted into a palletized cargo container by the addition of container walls 12 inserted inside the pallet and a cover 13 enclosing the walls of the container. As shown more clearly in FIG. 2, one of the walls of the container is separately removable and provides a panel door 14 positionable between container side wall extensions 15 and flaps 16 extending from the side wall corners. Since the flaps 16 are made of a flexible material, the panel door 14 may be placed into position from the front of the container as well as slid into position from the top of the container. The flaps 16 are adapted to position the panel door and provide weather protection at the joints between the panel door 14 and the container walls 12. Flaps 17 formed around the container walls and flap 18 along the panel door 14 provide a skirt around the container walls which overlaps the pallet at the joint between the container walls and the pallet side walls providing further weather protection. The flaps may be made of weatherized paper, cloth, or synthetic material. The bottom edge of the container side walls except for the sliding panel door extends to the bottom of the pallet and includes cutout portions 19 adapted to overlap cutout portions in the pallet as hereinafter described.

Each of the pallets described herein may be used separately as a pallet or converted into a palletized container as hereinafter described. As shown in FIG. 3, the pallet is comprised of a pallet base portion 20 having extensions 21 forming side walls for the pallet base portion. The side walls 21 have cutout holes 22 near the bottom adapted to receive the tines of a forklift truck. The flaps 23 from cutout holes 22 extend inwardly of the pallet and are adapted to overlay or be permanently fastened to a platform or baseboard 24 on which the cargo rests. The platform 24 is spaced from the bottom of the pallet by folded edge spacers 25. Alternatively, or in addition, the platform or baseboard 24 may be spaced from the bottom of the pallet by spacing blocks either solid or of a flexible material such as Styrofoam, polyurethane foam, or other suitable material to thereby act as shock absorbers for the cargo. When using the folded edges of the baseboard 24 as spacers 25, appropriate holes are left for insertion of the tines of a forklift truck. The holes may be cut clean as at 26 or may include flaps 27 inwardly extendable to provide further support between the platform or baseboard 24 and bottom of the pallet. The flaps 27 may be formed by scoring so as to be pushed inwardly upon insertion of the tines of a forklift truck.

In assembling the cargo container, the pallet is first assembled by positioning the baseboard 24 and spacers 25 within the pallet base portion 20. The extensions 21 are then folded upwardly to form the side walls of the pallet and suitably joined at adjacent corners with the flaps 23 overlaying the platform or baseboard 24 as shown in the exploded view of FIG. 2. Slits 28 may be formed in the platform for insertion of the flaps 23 from above to further interlock the baseboard and pallet bottom. The formed pallet is adapted for use as a custom-made pallet in which packaged cargo may be positioned. Such pallets are described in my U.S. patent application Ser. No. 688,918.

In order to convert the pallet to a palletized cargo container, the container side walls 12 are first inserted in the pallet between the platform 24 and pallet side walls 21 to rest at the bottom of the pallet. The lower edge of the container walls 12 are adapted to frictionally engage the pallet with cutout portions 19 matching the cutout portions 22 of the pallet. The flaps 17 on the container side walls form an overlapping skirt for weather protection at the joint between the container walls and pallet. Flaps 16 are inserted through the corner joints of the pallet so that they extend outwardly of the pallet and container walls as illustrated in FIG. 1. The panel door 14 is then placed between the side wall extensions 15 and flaps 16. The panel door 14 rests in place with flap 18 extending over the side of the pallet completing the weather-proof skirt which encircles the pallet. The bottom edge of the panel door rests above the holes 22 of the pallet in which the tines of the forklift truck are inserted. A folded extension 30 at the top of the panel door 14 further serves to position the door with respect to the container. The extension 30 folds over the top of the side wall extensions 15 to engage tabs 30a formed in the sides of the container walls 12. Top 13 may then be placed on the container enclosing the side walls and panel door 14 to provide structural support.

The pallet side wall 21a adjacent panel door 14 may be scored along a line 31 above the holes 22 so that the upper edge 32 of the side wall may be folded down to provide easy access to the inside of the container when the panel door 14 is removed.

Cutout portions 19 in the container walls 12 may be provided with inwardly extending flaps or doors 19a which engage the pallet and platform 24 to provide further interlocking engagement between the pallet and container walls.

The complete cargo container may be reinforced with straps passed through small holes in the pallet side walls formed for that purpose and around and over the cargo container. Such straps will further prevent separation of the pallet and container wall portions.

In the cargo container illustrated in FIG. 4 there is generally provided a container wall portion 40 enclosing a pallet and having cutout portions 41 in at least one side adapted to receive the tines of a forklift truck. Flaps 42 from the cutout portions 41 extend inwardly engaging the pallet. A cover 43 hinged along the back of the container overlies a front flap 44 hinged along the score line 45 which opens to provide easy access to the inside of the container.

As illustrated more clearly in FIG. 5, the front flap 44 includes a folded extension 46 which overlies folded extensions 47 from the sides of the container. Tabs 48 in the folded extensions 47 overlie the folded extension 46 of flap 45 in the closed position. Hinged cover 43 then overlies the tabs 48 and folded extensions 46 and 47 to maintain closure of the cargo container.

An alternate form of closure is illustrated in FIG. 6 in which the front flap 44a hinged along line 45a to provide easy access to the container includes a folded extension 46a having sloping side edges 50 and slots 51 adapted to be inserted from above into indentations 52 formed in the side wall extensions 47a and engage the indentations 52 in an interlocking relationship. The hinged cover or lid 43 may then be closed on top.

The pallet for the cargo container is shown in an inverted position in FIG. 7 in order to reveal the construction of the pallet. The pallet 50 is comprised of a pallet base portion 51 having side extensions 52 and end extensions 53. The end extensions 53 include multiple score lines 54 to permit the extensions 53 to be rolled into rectangular spacers 53a. The extensions 52 are also folded to provide further spacing means and also include holes 55 cut out therein to receive the tines of a forklift truck, and inwardly extending flaps 56 from the holes 55. In assembling the pallet, the end extensions 53 are rolled up to form rectangular spacers 53a. The extensions 52 are also folded up along score lines 57 and then inwardly along score lines 58. The pallet is then inverted so that cargo or packaged goods may rest on the pallet base portion 51 spaced from the ground by the folded edge extensions of the pallet base portion. The container wall portion 40 having four walls, a hinged lid and a front flap is positioned over the pallet so that the side walls enclose and frictionally engage the sides of the pallet, and so that the holes 55 in the pallet are lined with the holes 41 in the container wall. Flaps 42 in the container walls are then pushed inwardly as are the flaps 56 of the pallet holes 55 to provide further engagement between the container wall portion 40 and the pallet 50.

An alternate pallet for the palletized cargo container shown in FIG. 1 is illustrated in FIG. 8 comprised of a pallet base portion 60, platform 61 on which the cargo rests, and spacing blocks 62 between the platform 61 and pallet base portion 60. The pallet base portion 60 is comprised of a plurality of separate parts easily cut from stock items to produce in combination a desired custom pallet of specified dimensions.

As shown in the exploded view of FIG. 9, the pallet base portion 60 includes a bottom base 63 and separate side walls 64, 65, 66, and 67. Each of the side walls has a folded extension which overlaps the bottom base 63 for secure attachment thereto. At least one of the side walls has cutout portions 68 and flaps 69 formed therein at the bottom of the side wall adapted to receive the tines of a forklift truck. Spacers 62 are positioned on the bottom base 63 and may be secured in position. The spacers may be of a solid material or a flexible material for shock absorbing packaging. Platform 61 is then positioned on the spacers 62.

In fabricating the pallet, the overlapping folded extension of the side walls 64, 65, 66, and 67 are attached to the bottom base 63, the spacers 62 positioned on the base 63, and the platform 61 positioned on the spacers. The side walls are folded up and suitably secured at adjacent ends so that flaps 69 overlay the platform 61 to produce the pallet as shown in FIG. 8.

The component pieces of the pallet are stock items which may easily be cut to produce the desired dimensions in combination and thereby facilitate the fabrication of custom dimension pallets.

The cargo containers described herein are particularly suitable for use with cardboard materials. Other materials such as metal may also be used. For example, the containers may be formed of a composite material such as by laminating plywood to corrugated cardboard to provide a reinforced structure. The plywood may be laminated to the cardboard with a water base resin or glue. Other materials may also be laminated to corrugated cardboard to provide reinforced structural strength such as fibreboard, fibre glass, and other synthetic materials. The reinforced cardboard may be used in the pallet and portions particularly subject to load or stress.

Although only certain embodiments of the invention have been shown and described, other adaptations and modifications would be obvious.

What is claimed is:

1. A cargo container comprising: pallet means comprised of a pallet base portion having a bottom and side walls, at least one side wall having cutout portions therein at the bottom of the side wall adapted to receive the tines of a forklift truck, platform means positioned in the pallet base portion and on which cargo may be positioned, and spacing means positioned between the platform means and bottom of the pallet base portion adapted to bear the weight of the cargo; and container means including a container wall portion for a plurality of sides of the cargo container, said container wall portion being adapted to be inserted in the pallet between the platform means and the pallet side walls to rest at the bottom of the pallet and frictionally engage said pallet, said container wall portion having cutout portions adapted for alignment with the cutout portions of the pallet side walls, a portion of said container means being removable therefrom to provide a door for access to the inside of the container.

2. A cargo container as set forth in claim 1 wherein: said container wall portion has a downwardly extending skirt formed therearound to overlap the side walls of the pallet upon insertion of the container wall portion into said pallet and thereby provide weather protection.

3. A cargo container as set forth in claim 1 wherein: said door comprises a vertical panel door overlapping a hole formed in the container wall portion and wherein there is also provided on the container wall portion along the joint between the container wall and the vertical panel door, extending flaps which serve to position the sliding panel and provide weather protection at the joint.

4. A cargo container as set forth in claim 3 wherein said container wall portion comprises four walls and wherein one of said walls comprises said separate and removable vertical panel door.

5. A cargo container as set forth in claim 4 wherein: the side wall of said pallet adjacent said vertical panel door is provided with a horizontal reverse score at the level of the platform positioned in the pallet so that the upper edge of the pallet side wall may be folded down to permit access to the platform in the pallet.

6. A cargo container as set forth in claim 1 wherein: the spacing means between the pallet base portion and the platform means comprise folded edge extensions of said platform means and said folded edge extensions include cutout portions adapted to match the cutout portions in the side walls of the pallet.

7. A cargo container as set forth in claim 6 wherein: the cutout portions in said folded edge extensions of said platform include inwardly extending flaps thereby to provide further spacing means between said platform means and the bottom of said container base portion.

8. A cargo container as set forth in claim 1 wherein: the pallet base portion of said pallet is comprised of a plurality of pieces respectively attached together to form the pallet base portion; said separate pieces comprising first, second, third and fourth folded pieces each folded along a longitudinal line at right angles to form a side wall of the pallet and a bottom extending portion, said first, second, third, and fourth pieces being arranged with respect to each other at adjacent ends to form the walls of the pallet with the bottom extending portions overlapping; said pallet base portion also comprising a fifth piece comprising a bottom base positioned adjacent the overlapping bottom extending portions of the first, second, third, and fourth pieces and wherein at least certain of the adjacent portions of said pieces are attached together.

9. A cargo container as set forth in claim 1 wherein said cargo container is comprised of a cardboard material and at least a portion of said cargo container is comprised of laminated cardboard and plywood.

10. A cargo container comprising: a pallet comprised of a platform having extensions therefrom adapted to be folded thereunder to provide spacing means from the ground, at least one of said folded extensions having cutout portions formed therein adapted to receive the tines of a forklift truck, said platform adapted to have cargo positioned thereon and spaced from the ground by said extensions folded thereunder; and a container portion comprised of walls and a top, said container portion adapted to slide over said pallet and frictionally engage said pallet along its outer sides, at least one wall of said container portion having cutout portions at the bottom thereof adapted to match the cutout portions in said pallet, and flaps inwardly extendable to further engage said pallet in an interlocking relationship.

11. A cargo container as set forth in claim 10 wherein the top of said container portion comprises a lid hinged along one side wall and wherein the side wall opposite the lid hinge is hinged along a horizontal line spaced from the top of said side wall to permit the upper portion of said side wall to be folded back for easy access to the inside of said cargo container; said hinged side wall portion having a folded extension at its top adapted to extend over the top of extensions from adjacent walls of the cargo container and underlie the hinged lid top of the cargo container when closed.

12. A cargo container as set forth in claim 11 wherein: closure means are provided between the folded extension of the hinged side wall portion and extensions from adjacent side walls.

13. A cargo container as set forth in claim 10 wherein: said cargo container is comprised of a cardboard material and wherein at least a portion of said cargo container is comprised of a laminated cardboard and plywood.

14. A palletized cargo container comprising: pallet means comprising a platform adapted to receive cargo thereon and spacing means positioned beneath said platform; and container means comprising wall portions, said wall portions having cutout portions therein at the bottom of at least one side thereof adapted to receive the tines of a forklift truck, said container means being adapted to be positioned over said platform and spacing means and movable downwardly to a position to frictionally engage said pallet means, said wall portions extending to the bottom of said pallet means to enclose said platform and spacing means to provide a unified palletized cargo container.

15. A palletized cargo container as set forth in claim 14 wherein the cutout portions in said wall portions include inwardly extending flaps adapted to provide further interlocking engagement between the pallet means and container means.

References Cited

UNITED STATES PATENTS

| | | | |
|---|---|---|---|
| 2,358,614 | 9/1944 | Arbuthnot | 229—23 |
| 2,719,664 | 10/1955 | Hester | 229—23 |
| 2,765,112 | 10/1956 | Derman | 229—23 |
| 2,987,198 | 6/1961 | Crane | 229—23 X |
| 3,253,765 | 5/1966 | Train | 229—23 |
| 3,322,321 | 5/1967 | Nurre et al. | 229—23 |
| 3,348,673 | 10/1967 | Bahls et al. | 229—31 X |

DAVIS T. MOORHEAD, Primary Examiner

U.S. Cl. X.R.

108—56; 229—14